US010003704B2

(12) United States Patent
Seike et al.

(10) Patent No.: US 10,003,704 B2
(45) Date of Patent: *Jun. 19, 2018

(54) ARM ROTATING DEVICE AND IMAGE FORMING APPARATUS PROVIDED WITH THE SAME

(71) Applicant: Sharp Kabushiki Kaisha, Osaka (JP)

(72) Inventors: Toshihiko Seike, Osaka (JP); Takahisa Narikiyo, Osaka (JP); Kouji Wakamoto, Osaka (JP); Junya Masuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/232,131

(22) Filed: Aug. 9, 2016

(65) Prior Publication Data

US 2016/0352940 A1    Dec. 1, 2016

Related U.S. Application Data

(63) Continuation of application No. 14/481,121, filed on Sep. 9, 2014, now Pat. No. 9,438,756.

(30) Foreign Application Priority Data

Sep. 13, 2013   (JP) ................................. 2013-190063

(51) Int. Cl.
*F16M 11/00*     (2006.01)
*H04N 1/00*      (2006.01)
(Continued)

(52) U.S. Cl.
CPC ......... *H04N 1/00496* (2013.01); *F16M 11/08* (2013.01); *F16M 11/22* (2013.01);
(Continued)

(58) Field of Classification Search
CPC .............................. F16M 11/105; F16M 11/00
See application file for complete search history.

(56) References Cited

U.S. PATENT DOCUMENTS 2,823,413 A     2/1958  Stewart
3,949,728 A *   4/1976  Gustafsson ................ F41J 9/20
                                                   124/36

(Continued)

FOREIGN PATENT DOCUMENTS

CN    201437897 U    4/2010
CN    202205177 U    4/2012
(Continued)

OTHER PUBLICATIONS

Co-pending U.S. Appl. No. 14/481,121, filed Sep. 9, 2014. (application provided).

*Primary Examiner* — Amy J. Sterling
(74) *Attorney, Agent, or Firm* — Renner Otto Boisselle & Sklar, LLP

(57) ABSTRACT

The elastic force of a spring 41 in a direction of an arrow X is applied to an end 51A of a coil spring 5A in a direction of an arrow Y through a holding plate 42. The end 52A of the coil spring 5A is engaged with a holding hole 12 and regulated from moving in the direction of the arrow Y. The elastic force of the spring 41 in the direction of the arrow X is constantly applied to the coil spring 5A in a direction in which the peripheral surface of the support post 3 is tightened.

8 Claims, 8 Drawing Sheets

(51) Int. Cl.
*F16M 11/22* (2006.01)
*F16M 11/08* (2006.01)
*F16M 13/02* (2006.01)

(52) U.S. Cl.
CPC ......... *F16M 13/02* (2013.01); *H04N 1/00411* (2013.01); *H04N 1/00559* (2013.01); *F16M 2200/042* (2013.01); *H04N 2201/0094* (2013.01)

(56) References Cited

U.S. PATENT DOCUMENTS

| | | | |
|---|---|---|---|
| 5,152,029 A * | 10/1992 | Pai | E05D 5/10 16/54 |
| 5,606,773 A * | 3/1997 | Shappell | E05F 1/123 16/298 |
| 5,901,200 A | 5/1999 | Krause | |
| 6,609,272 B1 | 8/2003 | Lee | |
| 7,861,998 B2 * | 1/2011 | Huang | F16M 11/105 248/125.1 |
| 9,125,611 B2 | 9/2015 | Eaves | |
| 2011/0006179 A1 | 1/2011 | Holland | |

FOREIGN PATENT DOCUMENTS

| | | |
|---|---|---|
| CN | 102683081 A | 9/2012 |
| JP | 2001-356540 | 12/2001 |
| JP | 2011-081059 A | 4/2011 |
| JP | 2011-203614 | 10/2011 |

* cited by examiner

ARM ROTATING DEVICE AND IMAGE FORMING APPARATUS PROVIDED WITH THE SAME

CROSS REFERENCE

This Nonprovisional application claims priority under 35 U.S.C. § 119(a) on Patent Application No. 2013-190063 filed in Japan on Sep. 13, 2013, the entire contents of which are hereby incorporated by reference.

BACKGROUND OF THE INVENTION

The present invention relates to an arm rotating device having an arm with a free end and a fixed end and rotatably supporting the arm around a support post that is fixed on the side of the fixed end, the arm being configured to enable an operating body, such as an operating device and a display operating device, to be mounted on the side of the free end, and also relates to an image forming apparatus provided with such an arm rotating device.

An exemplary operating portion of an image forming apparatus includes a display operating device in which a touch panel is arranged on a surface of a display that displays an operating state and the like of the apparatus. In recent years, in accordance with multi-functionalization of image forming apparatuses, the amount of information to be displayed has increased and thus a display and a touch panel have become large in size. In addition, due to the enlargement of the size of a recording medium that can be subjected to an image forming process or diversification of processes to a recording medium, a feed path has become longer, so that the standing position of an operator to an image forming apparatus has not been fixed.

For this reason, for example, as disclosed in Japanese Patent Laid-Open Publication No. 2011-081059, some conventional image forming apparatuses are configured to rotatably support a display operating device with respect to the apparatus through an arm and a support post and enable the display operating device to be operated in an arbitrary position within a predetermined range. The display operating device receives a pressing operation by an operator in a switch arranged in the front face of the display operating device, or from a touch panel on the surface of a display.

As the arm becomes larger to cope with the increase in weight associated with the enlargement of a display, the pressing operation of the touch panel has easily generated vibration in the display operating device. In order to suppress this vibration, as the easiest way, measures in which a coil spring is wound around the peripheral surface of the support post and a load is applied to the rotating operation of the support post by the elastic force of the coil spring have been taken.

However, while the load to be applied increases as the arm becomes larger, if the winding force of the coil spring to the peripheral surface of the support post is increased, scraping occurs in the peripheral surface of the support post and the internal peripheral portion of the coil spring due to the repetition of the rotation of the arm and thus the load to be applied to the support post may be decreased. In addition, if the winding force of the coil spring is made too large, the load to the support post may be greatly decreased due to the error of component precision or assembly precision.

In any case, the decrease in load to the support post raises a problem that interferes with the pressing operation of the display operating device. This problem occurs similarly when an operating device other than the display operating device is mounted on the side of a free end of the arm.

An object of the present invention is to provide an arm rotating device capable of preventing a load to a support post from being decreased by causing a biasing force in a direction in which the elastic force of a coil spring is increased to be constantly applied to at least one end of the coil spring that is wounded around the support post and also capable of exactly performing a pressing operation with respect to an operating body, and to provide an image forming apparatus provided with such an arm rotating device.

SUMMARY OF THE INVENTION

An arm rotating device of the present invention is equipped with a support post, an arm, a coil spring, and a holding portion. The support post is rotatably supported within a predetermined angle of rotation. The arm has a fixed end and a free end, the arm being fixed to the support post on the side of the fixed end and configured to enable an operating body to be mounted on the side of the free end. The coil spring is wound around the peripheral surface of the support post. The holding portion holds at least one end of the coil spring in a movable manner while biasing the one end of the coil spring in a direction in which the elastic force of the coil spring is increased.

An image forming apparatus of the present invention includes: the above described arm rotating device; and an operating body that is mounted on the side of the free end of the arm of the arm rotating device and receives an input operation of information related to an image forming process.

The foregoing and other features and attendant advantages of the present invention will become more apparent from the reading of the following detailed description of the invention in conjunction with the accompanying drawings.

DETAILED DESCRIPTION OF THE INVENTION

Figure 1:
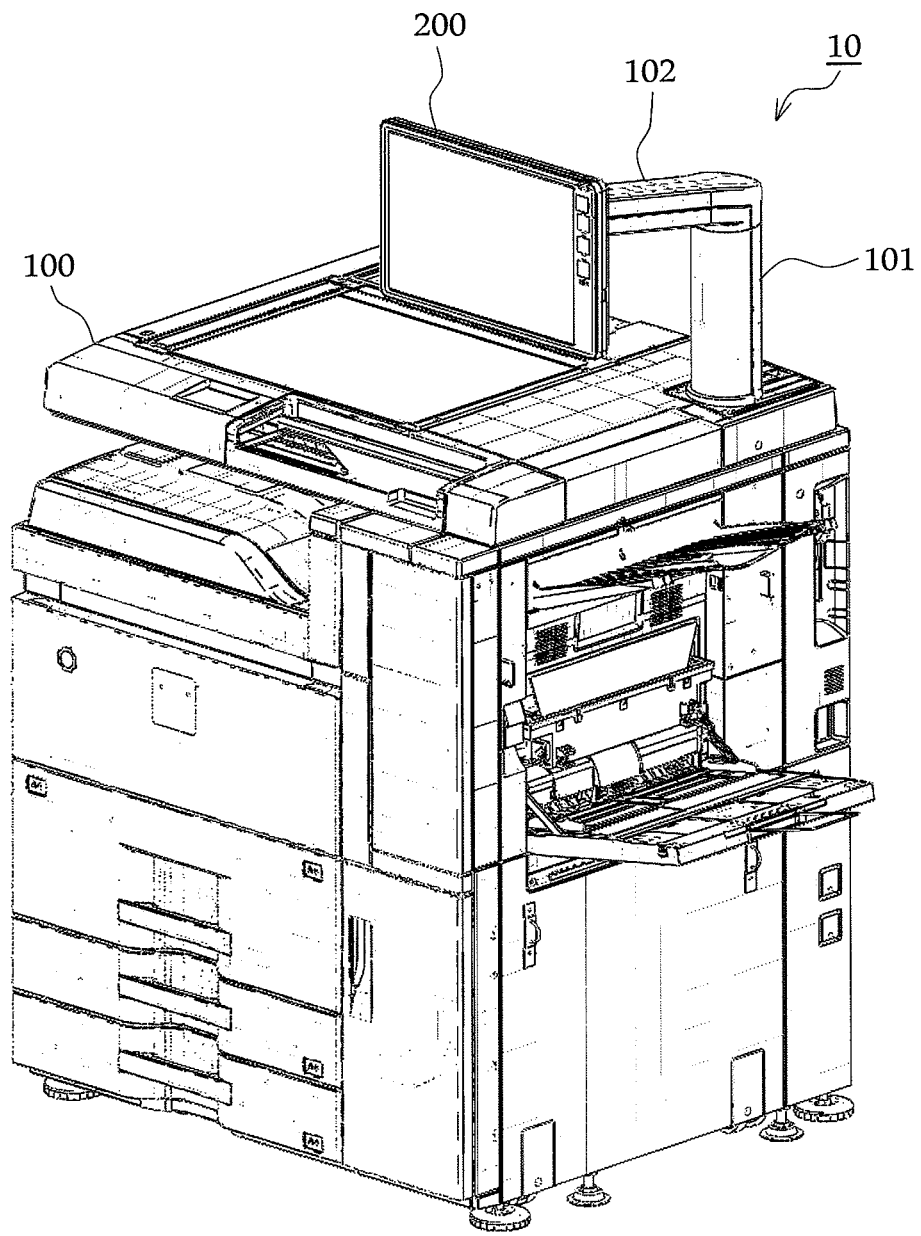
FIG. 1 is an external view showing an image forming apparatus equipped with an arm rotating device according to a preferred embodiment of the present invention.

Hereinafter, an arm rotating device according to a preferred embodiment of the present invention will be described with reference to the drawings. As shown in FIG. 1, an arm rotating device 10 according to a first preferred embodiment of the present invention is applied to an image forming apparatus 100 as an example. The arm rotating device 10 is equipped with a support post unit 101 and an arm unit 102. The support post unit 101 extends upward from the rear side of the upper surface of the image forming apparatus 100. The arm unit 102 includes a fixed end and a free end and is fixed to the upper end of the support post unit 101 on the side of the fixed end and configured to enable a display 200 to be mounted on the side of the free end. The display 200 is an operation body of the present invention and displays information related to an image forming process in the image forming apparatus 100. On the surface of the display 200, a touch panel that receives an input operation by an operator is arranged.

The support post unit 101 rotatably supports the arm unit 102 around a central axis. By rotating the arm unit 102 around the central axis of the support post unit 101, the display 200 moves from side to side. An operator who executes an operation to the image forming apparatus 100 can move the display 200 to a position in which the operator can easily operate the touch panel, according to a standing position with respect to the image forming apparatus 100.

Figure 2:
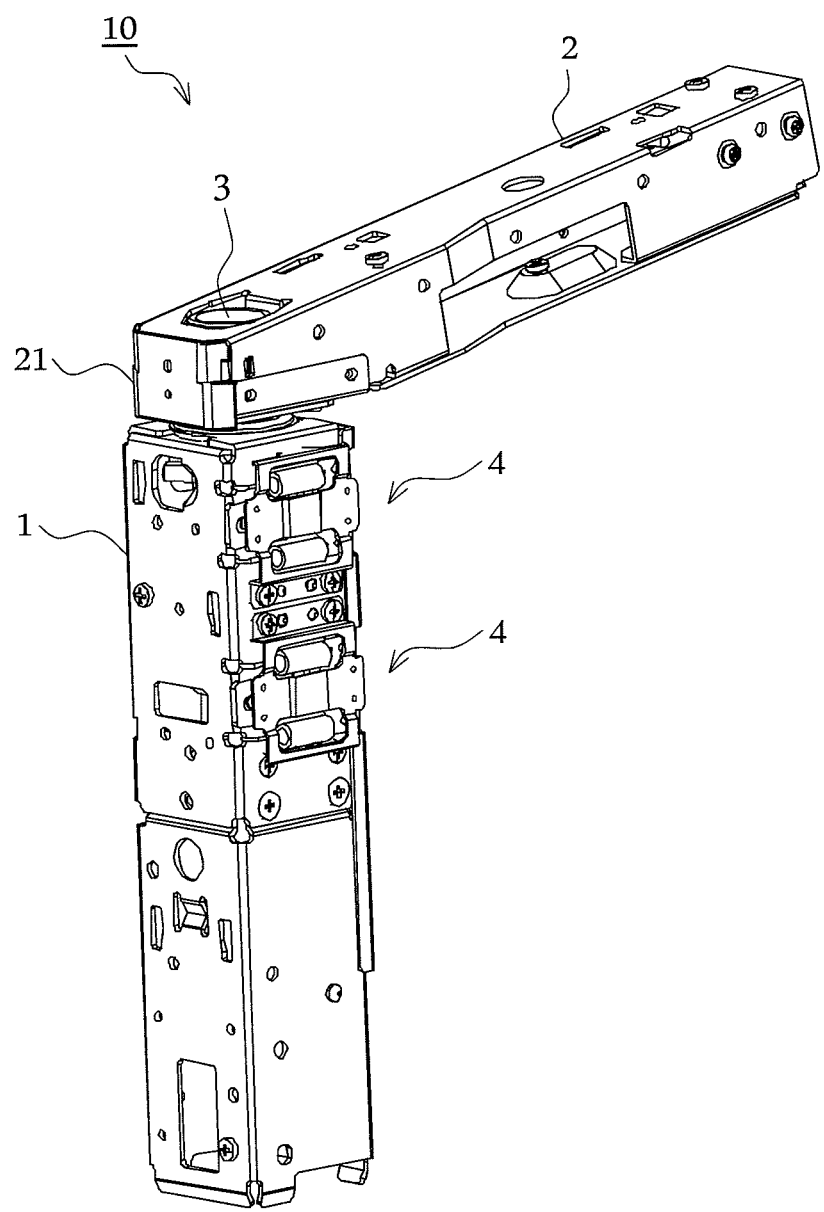
FIG. 2 is an external view showing a state in which a cover of an arm rotating device according to a first preferred embodiment of the present invention is removed.

As shown in FIG. 2, the arm rotating device 10, in a state in which a cover is removed, is equipped with a main body 1 and an arm 2. The main body 1 is stored in the cover of the support post unit 101 and rotatably supports a support post 3. The arm 2 is stored in the cover of the arm unit 102, and a fixed end 21 of the arm 2 is fixed to the upper end of the support post 3. The main body 1 has a rectangular tube shape as an example and is equipped with two upper and lower holding portion 4 on one side surface.

Figure 3:
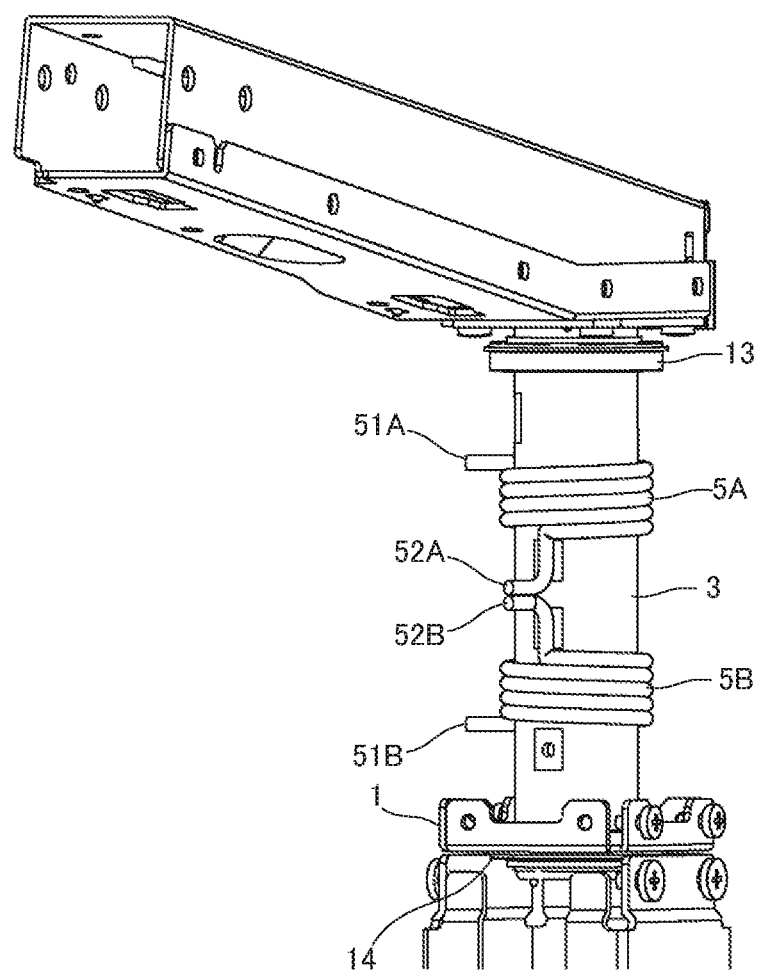
FIG. 3 is a view illustrating a winding state of a coil spring with respect to a support post of the arm rotating device.

As shown in FIG. 3, within the main body 1, bearings 13 and 14 that rotatably support upper and lower ends of the support post 3 are fixed. Around the peripheral surface of the support post 3, upper and lower two coil springs 5A and 5B (exemplary load members) are wound. The coil springs 5A and 5B, by winding the peripheral surface of the support post 3, cause a load to be applied to the rotation of the support post 3. Each of the coil springs 5A and 5B is arranged in a state in which first ends 51A and 51B are vertically spaced away from each other and second ends 52A and 52B are vertically close to each other.

Figure 4:
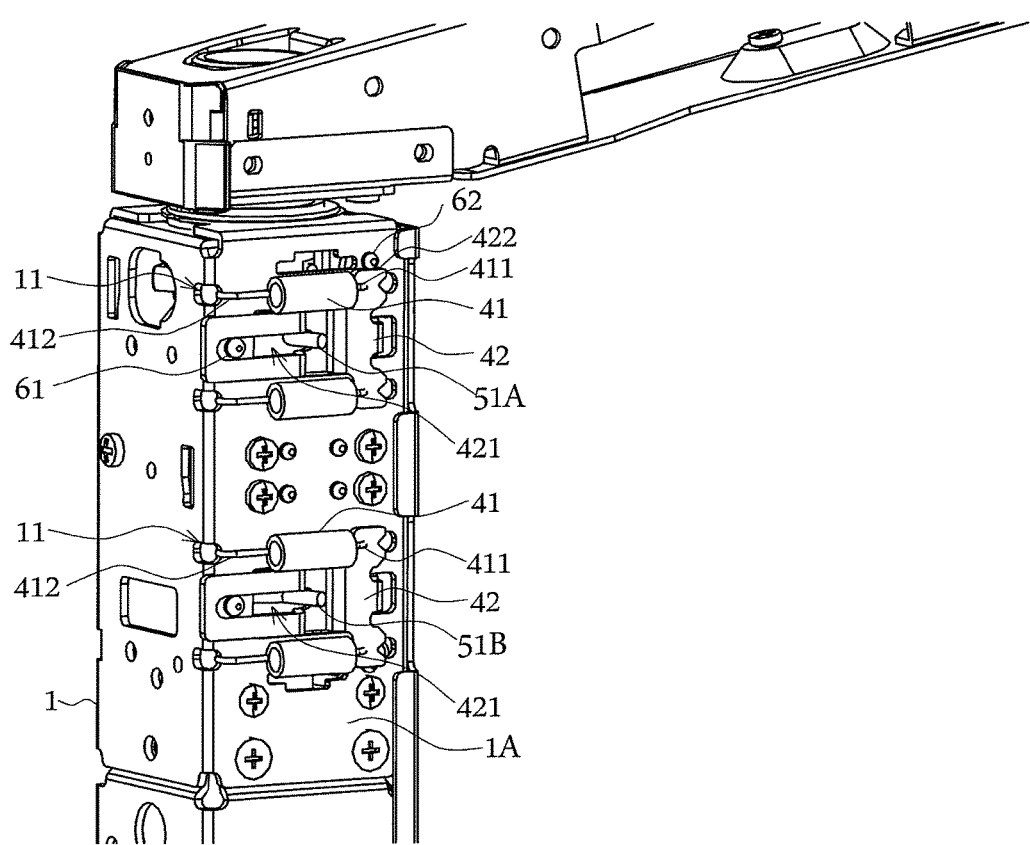
FIG. 4 is a view showing a configuration of a holding portion of the arm rotating device.

As shown in FIG. 4, two of the holding portions 4 are vertically and symmetrically arranged on the side surface 1A of the main body 1. Each of the holding portions 4 is equipped with a spring 41 (an exemplary biasing member) and a holding plate 42. According to this preferred embodiment, each of the holding portions 4 is equipped with two of the springs 41 as an example. The spring 41 is an elastic member defined by the present invention and includes a first end 411 that is engaged with the holding plate 42, and a second end 412 that is engaged with an engagement portion 11 of the main body 1.

The holding plate 42 is an inelastic member defined by the present invention, and the ends 51A and 51B of the coil springs 5A and 5B together with the first end 411 of the spring 41 are engaged with the holding plate 42. The holding plate 42 is held so as to be horizontally movable on the side surface 1A. Specifically, a projection 61 that is fitted into a long hole 421 of the holding plate 42 and a projection 62 that contacts a side surface 422 parallel to the moving direction in the holding plate 42 are formed on the side surface 1A. The projections 61 and 62 are equivalent to the contact member as a regulating member of the present invention. Since having a part that contacts the long hole 421 and the side surface 422 and that is formed into an arc shape and point contacting the long hole 421 and the side surface 422, the projections 61 and 62 can move the holding plate 42 smoothly.

It is to be noted the holding plate 42 is provided so as to reliably move mainly the ends 51A and 51B of the coil springs 5A and 5B, and the spring 41 only in a direction in which the elastic force of the coil springs 5A and 5B is increased and decreased. Therefore, if the ends 51A and 51B of the coil springs 5A and 5B, and the spring 41 can be reliably moved only in the direction in which the elastic force of the coil springs 5A and 5B is increased and decreased, the holding plate 42 can be eliminated. For example, it is also possible to form a horizontally directed long hole into which the ends 51A and 51B on the side surface 1A of the main body 1 are fitted and to cause the end of the spring 41 to be directly engaged with the ends 51A and 51B that penetrate the long hole and are exposed to the outside of the main body 1.

In addition, the shape of the main body 1 is not limited to the rectangular tube shape. On condition that the ends 51A and 51B of the coil springs 5A and 5B, and the spring 41 can be smoothly moved in the direction in which the elastic force of the coil springs 5A and 5B is increased and decreased, the main body 1 can be formed into an arbitrary shape.

Figure 5:
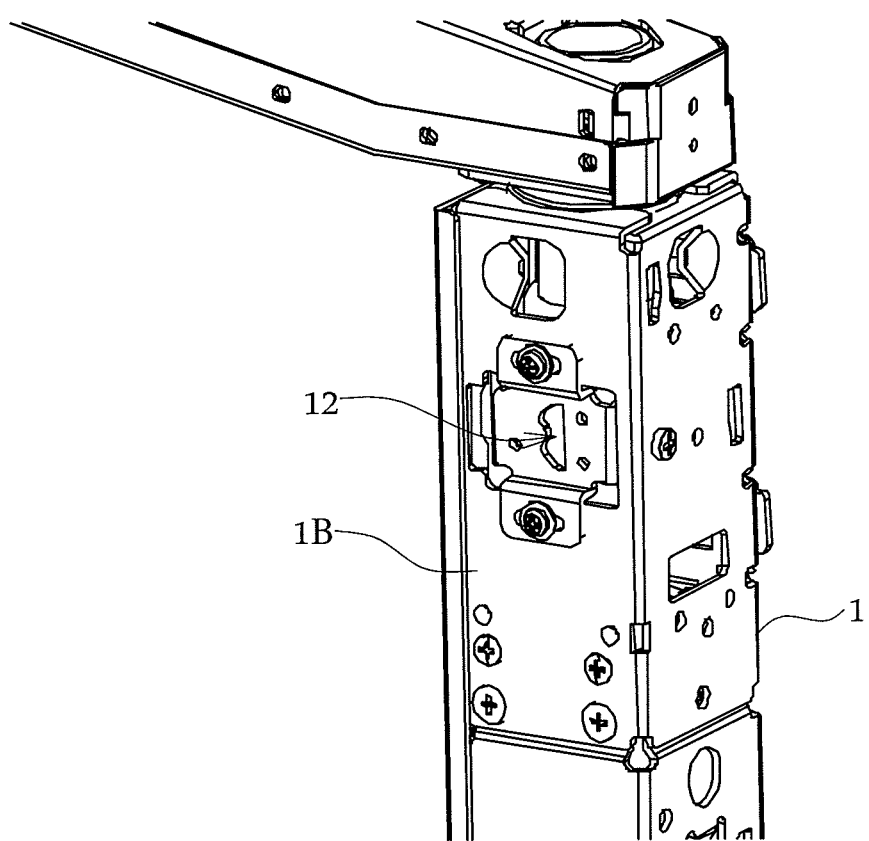
FIG. 5 is a view showing a part that holds an end on an opposite side of the holding portion of the coil spring in the arm rotating device.

As shown in FIG. 5, on a side surface 1B opposite to the side surface 1A in the main body 1, a holding hole 12 is formed. With the holding hole 12, the ends 52A and 52B of the coil springs 5A and 5B shown in FIG. 3 are engaged.

The holding hole 12 need not be necessarily formed on the side surface 1B. According to the positional relationship between the ends 51A and 51B and the ends 52A and 52B in the coil springs 51A and 5B in a plan view, the holding hole 12 can be formed on other side surfaces including the side surface 1A of the main body 1. It may be possible to improve workability in assembling by forming the holding hole 12 on the side surface 1A equipped with the holding portion 4.

Figure 6:
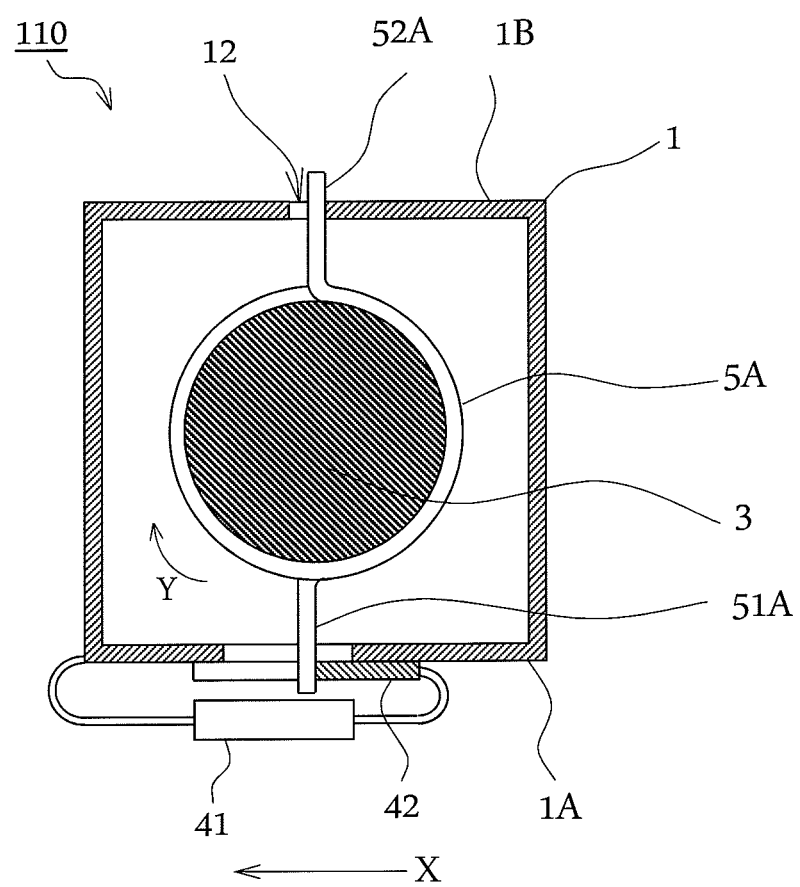
FIG. 6 is a sectional side view illustrating a function of the holding portion of the arm rotating device.

As shown in FIG. 6, the elastic force of the spring 41 in a direction of an arrow X is applied to the end 51A of the coil spring 5A in a direction of an arrow Y through the holding plate 42. The end 52A of the coil spring 5A is engaged with the holding hole 12 and regulated from moving in the direction of the arrow Y. Therefore, the elastic force of the spring 41 in the direction of the arrow X is constantly applied to the coil spring 5A in a tightening direction in which the peripheral surface of the support post 3 is tightened. The same may be applied to the coil spring 5B.

Even when variation occurs in dimensional precision and attachment precision of the support post 3, the coil springs 5A and 5B, each portion of the main body 1, and the like, the rotational load of the support post 3 can be maintained at a proper value by the coil springs 5A and 5B. Moreover, even when scraping occurs in the peripheral surface of the support post 3 and the internal peripheral surface of the coil springs 5A and 5B due to the repetition of the rotation of the support post 3, the rotational load of the support post 3 can also be maintained at a proper value by the coil springs 5A and 5B.

By reversing the tightening direction with respect to the peripheral surface of the support post 3 by the coil spring 5A and the coil spring 5B, even when the support post 3 rotates in either the clockwise direction or the counterclockwise direction in FIG. 6, a load with respect to the support post 3 can be made constant. For example, the support post 3 and the coil springs 5A and 5B are arranged so that the coil spring 5A tightens the peripheral surface of the support post 3 when the support post 3 rotates in the clockwise direction and the coil spring 5B tightens the peripheral surface of the support post 3 when the support post 3 rotates in the counterclockwise direction. This can be realized by reversing the winding directions of the coil spring 5A and the coil spring 5B or by reversing the positions of the ends 51A and 51B and the ends 52A and 52B.

It should be noted while the arm rotating device 10 is equipped with two coil springs 5A and 5B, the arm rotating device 10 can also be equipped with only a single coil spring or three or more coil springs on the condition that the rotational load with respect to the support post 3 can be properly maintained.

Figure 7:
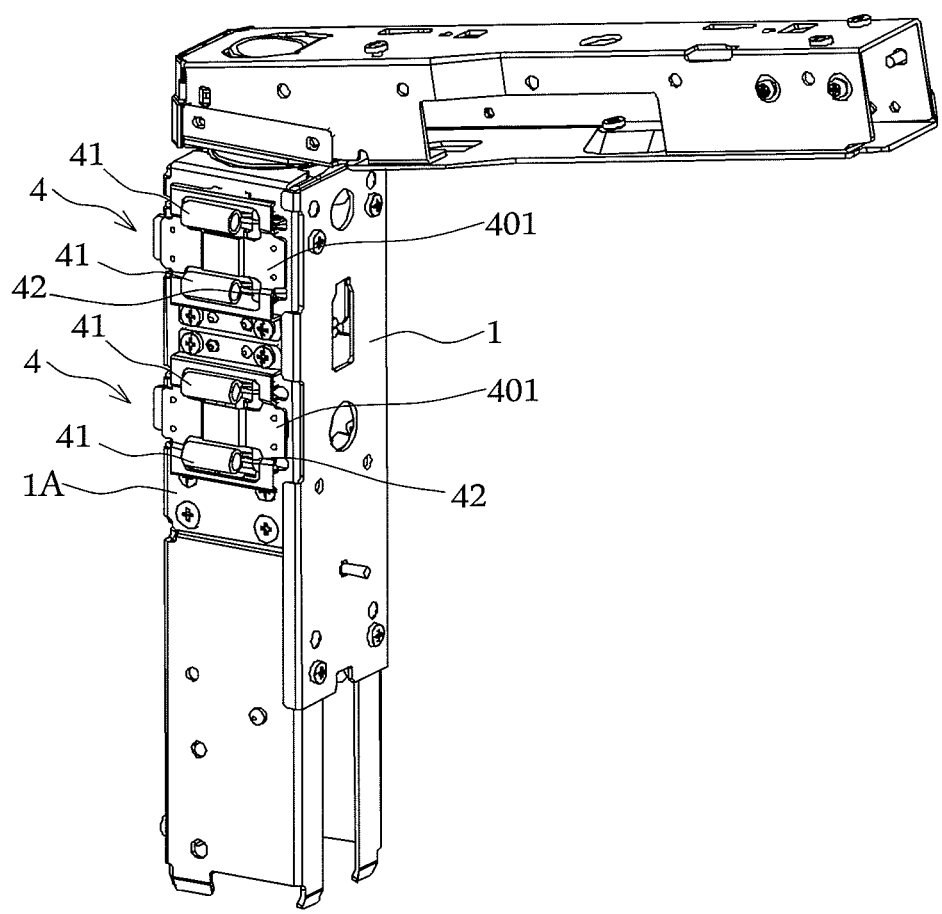
FIG. 7 is an external view showing a state in which a cover of an arm rotating device according to a second preferred embodiment of the present invention is removed.

As shown in FIG. 7, an arm rotating device 110 according to a second preferred embodiment of the present invention is different from the arm rotating device 10 in that the holding portion 4 includes a cover 401, and the other configurations are in common with the configurations of the arm rotating device 10. The cover 401 is mounted on the side surface 1A and covers the both ends of the spring 41 in the holding portion 4 together with the holding plate 42. This, at a time of the assembly of the arm rotating device 110, prevents the spring 41 and the holding plate 42 from being flipped away by the elastic force of the spring 41 or the coil springs 5A and 5B.

Figure 8:
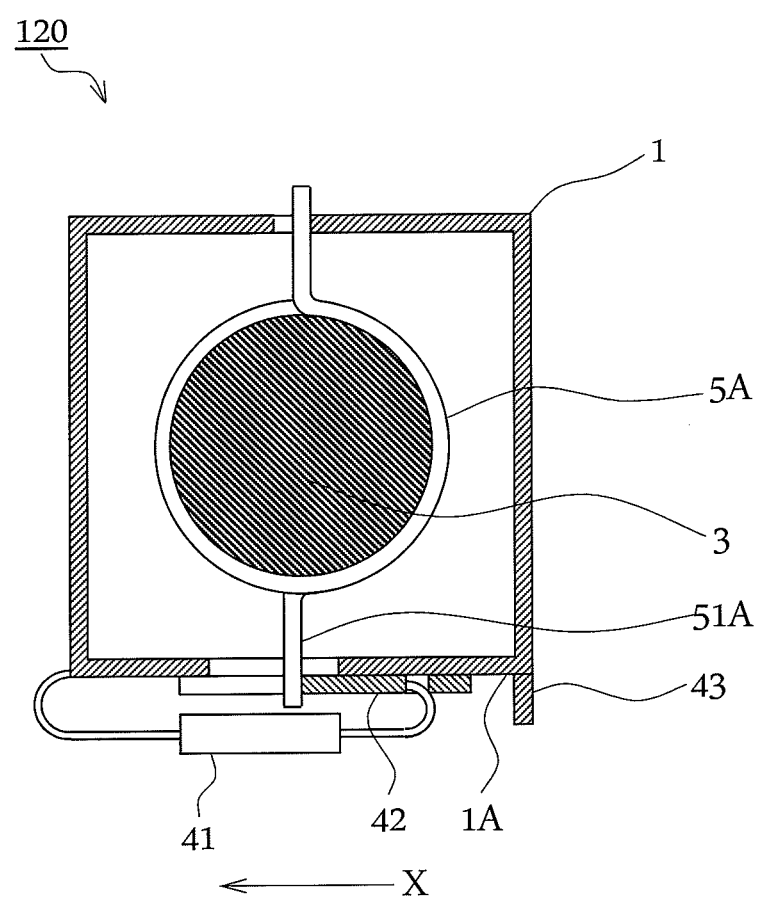
FIG. 8 is a sectional side view showing a holding portion of an arm rotating device according to a third preferred embodiment of the present invention.

As shown in FIG. 8, an arm rotating device 120 according to a third preferred embodiment of the present invention is different from the arm rotating device 10 in that a stopper 43 is provided on the upstream of the moving direction (arrow X direction) of the holding plate 42 by the spring 41, and the other configurations are in common with the configurations of the arm rotating device 10. In a case in which the load to the support post 3 during rotation in the clockwise direction of the support post 3 is different from the load to the support post 3 during rotation in the counterclockwise direction of the support post 3, when the support post 3 rotates in the clockwise direction or the counterclockwise rotation, one of the coil springs 5A and 5B (only the coil spring 5A is shown in FIG. 8) may be excessively deformed in a loosening direction. Accordingly, the stopper 43 regulates the excessive movement of the holding plate 42 in the loosening direction of the coil springs 5A and 5B and prevents the rotational load of the support post 3 from being remarkably decreased.

As a fourth preferred embodiment of the present invention, the projection 62 as a contact member may be formed of a rotating body such as a roller, which can reduce frictional resistance with the side surface 422 of the holding plate 42 and can move the holding plate 42 further smoothly.

The arm rotating device of the present invention is applicable not only to an image forming apparatus but also similarly to other devices that support an operation body in a movable manner.

The foregoing preferred embodiments are to be considered in all respects as illustrative and not restrictive. The scope of the present invention is defined by the following claims, not by the foregoing embodiments. Further, the scope of the present invention is intended to include the scopes of the claims and all possible changes and modifications within the senses and scopes of equivalents.

The invention claimed is:

1. An image forming apparatus comprising:
a rotating device, and
an operating body that receives a pressing operation, wherein the rotating device comprises:
a support post that is rotatably supported within a predetermined angle of rotation with respect to the device;
a load member that applies a load due to friction to a peripheral surface of the support post when the support post rotates; and
a biasing member that biases the load member in a direction in which the load is increased, and
wherein the operating body is fixed to the support post and receives an input operation of information related to an image forming process.

2. The image forming apparatus according to claim 1, wherein:
the load member is an elastic member; and
the biasing member biases the elastic member in a direction in which an elastic force of the elastic member is increased.

3. The image forming apparatus according to claim 2, wherein the rotating device further comprises:
an inelastic member that is connected to the load member and the biasing member; and
a regulating member that regulates a moving direction of the inelastic member.

4. The image forming apparatus according to claim 3, wherein the regulating member is a contact member that contacts a side surface parallel to the moving direction of the inelastic member while being capable of relatively sliding to the side surface.

5. The image forming apparatus according to claim 4, wherein the contact member includes a point contact member that comes into point contact with the side surface of the inelastic member.

6. The image forming apparatus according to claim 3, wherein the rotating device further comprises a stopper that is provided at least one of upstream and downstream of the moving direction and limits a moving range of the inelastic member.

7. The image forming apparatus according to claim 1, wherein
the rotating device further comprises a plurality of the load members, and
at least one of the load members applies a load to the support post in a peripheral direction of the support post, the load being opposite in direction to a load of another one of the load members.

8. The image forming apparatus according to claim 1, further comprising an arm that has a fixed end and a free end, the arm being fixed to the support post on a side of the fixed end and being attached to the operating body on a side of the free end.

* * * * *